(12) United States Patent
Barker et al.

(10) Patent No.: US 11,990,706 B2
(45) Date of Patent: May 21, 2024

(54) CABLE TETHER SYSTEM

(71) Applicant: Masimo Corporation, Irvine, CA (US)

(72) Inventors: Nicholas Evan Barker, Laguna Beach, CA (US); Susan Denton, Laguna Beach, CA (US); Eric Yang, Baldwin Park, CA (US); Sujin Hwang, Rancho Santa Margarita, CA (US)

(73) Assignee: Masimo Corporation, Irvine, CA (US)

( * ) Notice: Subject to any disclaimer, the term of this patent is extended or adjusted under 35 U.S.C. 154(b) by 21 days.

(21) Appl. No.: 17/170,652

(22) Filed: Feb. 8, 2021

(65) Prior Publication Data

US 2021/0210899 A1 Jul. 8, 2021

Related U.S. Application Data

(63) Continuation of application No. 15/018,745, filed on Feb. 8, 2016, now Pat. No. 10,916,882, which is a continuation of application No. 13/762,062, filed on Feb. 7, 2013, now Pat. No. 9,267,572.

(60) Provisional application No. 61/596,555, filed on Feb. 8, 2012.

(51) Int. Cl.
| | |
|---|---|
| *H01R 13/639* | (2006.01) |
| *F16G 11/00* | (2006.01) |
| *G09F 3/02* | (2006.01) |
| *H01R 13/60* | (2006.01) |

(52) U.S. Cl.
CPC ............. *H01R 13/60* (2013.01); *F16G 11/00* (2013.01); *G09F 3/02* (2013.01); *H01R 13/6392* (2013.01); *Y10T 24/398* (2015.01)

(58) Field of Classification Search
CPC .. H01R 24/20; H01R 13/6392; H01R 13/639; H01R 13/5804; H01R 13/5812; H01R 13/60; F16B 45/02; E05B 67/06; E05B 73/0005; Y10T 24/44077; Y10T 24/44085; Y10T 24/398; Y10T 24/31; F16G 11/00; G09F 3/02; B60P 7/0823
USPC ........................ 248/60, 61, 62, 63, 67.7, 74.3
See application file for complete search history.

(56) References Cited

U.S. PATENT DOCUMENTS

| | | | | | |
|---|---|---|---|---|---|
| 759,787 | A | * | 5/1904 | Wey ........................ | H02G 7/10 248/61 |
| 2,725,543 | A | * | 11/1955 | Tanner ............... | H01R 13/6392 439/369 |
| 4,440,465 | A | * | 4/1984 | Elliott ................ | H01R 13/6392 24/326 |
| 4,960,128 | A | | 10/1990 | Gordon et al. | |
| 4,964,408 | A | | 10/1990 | Hink et al. | |
| 5,319,355 | A | | 6/1994 | Russek | |
| 5,336,107 | A | * | 8/1994 | Sheryll ............. | H01R 13/6392 439/369 |

(Continued)

OTHER PUBLICATIONS

US 2022/0192529 A1, 06/2022, Al-Ali et al. (withdrawn)

*Primary Examiner* — Jack W Lavinder
(74) *Attorney, Agent, or Firm* — Knobbe, Martens, Olson & Bear, LLP

(57) ABSTRACT

A cable tether system includes a base member and at least one elongate member extending away from the base member. The elongate member is configured to surround at least a portion of a first cable. A second elongate member can be configured to surround at least a portion of a second cable. The base member can include one or more engagement portions that couple with one or more engagement portions on the first and second elongate members.

14 Claims, 12 Drawing Sheets

(56) References Cited

U.S. PATENT DOCUMENTS

| | | |
|---|---|---|
| 5,337,744 A | 8/1994 | Branigan |
| 5,341,805 A | 8/1994 | Stavridi et al. |
| D353,195 S | 12/1994 | Savage et al. |
| D353,196 S | 12/1994 | Savage et al. |
| 5,377,676 A | 1/1995 | Vari et al. |
| D359,546 S | 6/1995 | Savage et al. |
| 5,431,170 A | 7/1995 | Mathews |
| 5,436,499 A | 7/1995 | Namavar et al. |
| D361,840 S | 8/1995 | Savage et al. |
| D362,063 S | 9/1995 | Savage et al. |
| D363,120 S | 10/1995 | Savage et al. |
| 5,456,252 A | 10/1995 | Vari et al. |
| 5,479,934 A | 1/1996 | Imran |
| 5,482,036 A | 1/1996 | Diab et al. |
| 5,494,043 A | 2/1996 | O'Sullivan et al. |
| 5,533,511 A | 7/1996 | Kaspari et al. |
| 5,561,275 A | 10/1996 | Savage et al. |
| 5,590,649 A | 1/1997 | Caro et al. |
| 5,602,924 A | 2/1997 | Durand et al. |
| 5,638,816 A | 6/1997 | Kiani-Azarbayjany et al. |
| 5,638,818 A | 6/1997 | Diab et al. |
| 5,645,440 A | 7/1997 | Tobler et al. |
| 5,671,914 A | 9/1997 | Kalkhoran et al. |
| 5,726,440 A | 3/1998 | Kalkhoran et al. |
| D393,830 S | 4/1998 | Tobler et al. |
| 5,743,262 A | 4/1998 | Lepper, Jr. et al. |
| 5,747,806 A | 5/1998 | Khalil et al. |
| 5,750,994 A | 5/1998 | Schlager |
| 5,752,848 A | 5/1998 | Youngmark |
| 5,758,644 A | 6/1998 | Diab et al. |
| 5,760,910 A | 6/1998 | Lepper, Jr. et al. |
| 5,890,929 A | 4/1999 | Mills et al. |
| 5,919,134 A | 7/1999 | Diab |
| 5,987,343 A | 11/1999 | Kinast |
| 5,997,343 A | 12/1999 | Mills et al. |
| 6,002,952 A | 12/1999 | Diab et al. |
| 6,010,937 A | 1/2000 | Karam et al. |
| 6,027,452 A | 2/2000 | Flaherty et al. |
| 6,033,251 A | 3/2000 | Cook |
| 6,040,578 A | 3/2000 | Malin et al. |
| 6,066,204 A | 5/2000 | Haven |
| 6,115,673 A | 9/2000 | Malin et al. |
| 6,124,597 A | 9/2000 | Shehada et al. |
| 6,128,521 A | 10/2000 | Marro et al. |
| 6,129,675 A | 10/2000 | Jay |
| 6,144,868 A | 11/2000 | Parker |
| 6,152,754 A | 11/2000 | Gerhardt et al. |
| 6,184,521 B1 | 2/2001 | Coffin, IV et al. |
| 6,217,366 B1 * | 4/2001 | Weisstock .......... H01R 13/6392 439/367 |
| 6,232,609 B1 | 5/2001 | Snyder et al. |
| 6,241,683 B1 | 6/2001 | Macklem et al. |
| 6,253,097 B1 | 6/2001 | Aronow et al. |
| 6,255,708 B1 | 7/2001 | Sudharsanan et al. |
| 6,280,381 B1 | 8/2001 | Malin et al. |
| 6,285,896 B1 | 9/2001 | Tobler et al. |
| 6,308,089 B1 | 10/2001 | von der Ruhr et al. |
| 6,317,627 B1 | 11/2001 | Ennen et al. |
| 6,321,100 B1 | 11/2001 | Parker |
| 6,334,065 B1 | 12/2001 | Al-Ali et al. |
| 6,360,114 B1 | 3/2002 | Diab et al. |
| 6,368,283 B1 | 4/2002 | Xu et al. |
| 6,411,373 B1 | 6/2002 | Garside et al. |
| 6,415,167 B1 | 7/2002 | Blank et al. |
| 6,430,437 B1 | 8/2002 | Marro |
| 6,430,525 B1 | 8/2002 | Weber et al. |
| 6,463,311 B1 | 10/2002 | Diab |
| 6,470,199 B1 | 10/2002 | Kopotic et al. |
| 6,487,429 B2 | 11/2002 | Hockersmith et al. |
| 6,505,059 B1 | 1/2003 | Kollias et al. |
| 6,525,386 B1 | 2/2003 | Mills et al. |
| 6,526,300 B1 | 2/2003 | Kiani et al. |
| 6,534,012 B1 | 3/2003 | Hazen et al. |
| 6,542,764 B1 | 4/2003 | Al-Ali et al. |
| 6,580,086 B1 | 6/2003 | Schulz et al. |
| 6,584,336 B1 | 6/2003 | Ali et al. |
| 6,587,196 B1 | 7/2003 | Stippick et al. |
| 6,587,199 B1 | 7/2003 | Luu |
| 6,595,316 B2 | 7/2003 | Cybulski et al. |
| 6,597,932 B2 | 7/2003 | Tian et al. |
| 6,606,511 B1 | 8/2003 | Ali et al. |
| 6,635,559 B2 | 10/2003 | Greenwald et al. |
| 6,639,668 B1 | 10/2003 | Trepagnier |
| 6,640,116 B2 | 10/2003 | Diab |
| 6,640,117 B2 | 10/2003 | Makarewicz et al. |
| 6,658,276 B2 | 12/2003 | Kiani et al. |
| 6,661,161 B1 | 12/2003 | Lanzo et al. |
| 6,697,656 B1 | 2/2004 | Al-Ali |
| 6,697,658 B2 | 2/2004 | Ai-Ali |
| RE38,476 E | 3/2004 | Diab et al. |
| RE38,492 E | 4/2004 | Diab et al. |
| 6,738,652 B2 | 5/2004 | Mattu et al. |
| 6,760,607 B2 | 7/2004 | Al-Ali |
| 6,788,965 B2 | 9/2004 | Ruchti et al. |
| 6,816,241 B2 | 11/2004 | Grubisic |
| 6,822,564 B2 | 11/2004 | Al-Ali |
| 6,850,787 B2 | 2/2005 | Weber et al. |
| 6,850,788 B2 | 2/2005 | Al-Ali |
| 6,876,931 B2 | 4/2005 | Lorenz et al. |
| 6,920,345 B2 | 7/2005 | Al-Ali et al. |
| 6,934,570 B2 | 8/2005 | Kiani et al. |
| 6,943,348 B1 | 9/2005 | Coffin IV |
| 6,956,649 B2 | 10/2005 | Acosta et al. |
| 6,961,598 B2 | 11/2005 | Diab |
| 6,970,792 B1 | 11/2005 | Diab |
| 6,985,764 B2 | 1/2006 | Mason et al. |
| 6,990,364 B2 | 1/2006 | Ruchti et al. |
| 6,997,734 B1 * | 2/2006 | McQuirter ......... H01R 13/6392 439/369 |
| 6,998,247 B2 | 2/2006 | Monfre et al. |
| 7,003,338 B2 | 2/2006 | Weber et al. |
| 7,015,451 B2 | 3/2006 | Dalke et al. |
| 7,027,849 B2 | 4/2006 | Al-Ali |
| D526,719 S | 8/2006 | Richie, Jr. et al. |
| 7,096,052 B2 | 8/2006 | Mason et al. |
| 7,096,054 B2 | 8/2006 | Abdul-Hafiz et al. |
| D529,616 S | 10/2006 | Deros et al. |
| 7,133,710 B2 | 11/2006 | Acosta et al. |
| 7,142,901 B2 | 11/2006 | Kiani et al. |
| 7,225,006 B2 | 5/2007 | Al-Ali et al. |
| RE39,672 E | 6/2007 | Shehada et al. |
| 7,254,429 B2 | 8/2007 | Schurman et al. |
| 7,254,431 B2 | 8/2007 | Al-Ali et al. |
| 7,254,434 B2 | 8/2007 | Schulz et al. |
| 7,274,955 B2 | 9/2007 | Kiani et al. |
| D554,263 S | 10/2007 | Al-Ali et al. |
| 7,280,858 B2 | 10/2007 | Al-Ali et al. |
| 7,289,835 B2 | 10/2007 | Mansfield et al. |
| 7,292,883 B2 | 11/2007 | De Felice et al. |
| 7,341,559 B2 | 3/2008 | Schulz et al. |
| 7,343,186 B2 | 3/2008 | Lamego et al. |
| D566,282 S | 4/2008 | Al-Ali et al. |
| 7,356,365 B2 | 4/2008 | Schurman |
| 7,371,981 B2 | 5/2008 | Abdul-Hafiz |
| 7,373,193 B2 | 5/2008 | Al-Ali et al. |
| 7,377,794 B2 | 5/2008 | Al-Ali et al. |
| D570,676 S | 6/2008 | Hager |
| 7,395,158 B2 | 7/2008 | Monfre et al. |
| 7,415,297 B2 | 8/2008 | Al-Ali et al. |
| 7,438,683 B2 | 10/2008 | Al-Ali et al. |
| 7,483,729 B2 | 1/2009 | Al-Ali et al. |
| D587,657 S | 3/2009 | Al-Ali et al. |
| 7,500,950 B2 | 3/2009 | Al-Ali et al. |
| 7,509,494 B2 | 3/2009 | Al-Ali |
| 7,510,849 B2 | 3/2009 | Schurman et al. |
| 7,514,725 B2 | 4/2009 | Wojtczuk et al. |
| 7,519,406 B2 | 4/2009 | Blank et al. |
| D592,507 S | 5/2009 | Wachman et al. |
| 7,530,942 B1 | 5/2009 | Diab |
| 7,593,230 B2 | 9/2009 | Abul-Haj et al. |
| 7,596,398 B2 | 9/2009 | Al-Ali et al. |
| 7,606,608 B2 | 10/2009 | Blank et al. |
| 7,620,674 B2 | 11/2009 | Ruchti et al. |
| D606,659 S | 12/2009 | Kiani et al. |

(56) References Cited

U.S. PATENT DOCUMENTS

| | | |
|---|---|---|
| 7,629,039 B2 | 12/2009 | Eckerbom et al. |
| 7,640,140 B2 | 12/2009 | Ruchti et al. |
| 7,647,083 B2 | 1/2010 | Al-Ali et al. |
| D609,193 S | 2/2010 | Al-Ali et al. |
| D614,305 S | 4/2010 | Al-Ali et al. |
| 7,697,966 B2 | 4/2010 | Monfre et al. |
| 7,698,105 B2 | 4/2010 | Ruchti et al. |
| RE41,317 E | 5/2010 | Parker |
| RE41,333 E | 5/2010 | Blank et al. |
| 7,729,733 B2 | 6/2010 | Al-Ali et al. |
| 7,761,127 B2 | 7/2010 | Al-Ali et al. |
| 7,764,982 B2 | 7/2010 | Dalke et al. |
| D621,516 S | 8/2010 | Kiani et al. |
| 7,791,155 B2 | 9/2010 | Diab |
| RE41,912 E | 11/2010 | Parker |
| 7,880,626 B2 | 2/2011 | Al-Ali et al. |
| 7,909,772 B2 | 3/2011 | Popov et al. |
| 7,919,713 B2 | 4/2011 | Al-Ali et al. |
| 7,937,128 B2 | 5/2011 | Al-Ali |
| 7,937,129 B2 | 5/2011 | Mason et al. |
| 7,941,199 B2 | 5/2011 | Kiani |
| 7,957,780 B2 | 6/2011 | Lamego et al. |
| 7,962,188 B2 | 6/2011 | Kiani et al. |
| 7,972,165 B1 * | 7/2011 | Lifson ............... H01R 13/6392 439/373 |
| 7,976,472 B2 | 7/2011 | Kiani |
| 7,990,382 B2 | 8/2011 | Kiani |
| 8,008,088 B2 | 8/2011 | Bellott et al. |
| RE42,753 E | 9/2011 | Kiani-Azarbayjany et al. |
| 8,028,701 B2 | 10/2011 | Al-Ali et al. |
| 8,048,040 B2 | 11/2011 | Kiani |
| 8,050,728 B2 | 11/2011 | Al-Ali et al. |
| RE43,169 E | 2/2012 | Parker |
| 8,118,620 B2 | 2/2012 | Al-Ali et al. |
| 8,130,105 B2 | 3/2012 | Al-Ali et al. |
| 8,182,443 B1 | 5/2012 | Kiani |
| 8,190,223 B2 | 5/2012 | Al-Ali et al. |
| 8,203,438 B2 | 6/2012 | Kiani et al. |
| 8,203,704 B2 | 6/2012 | Merritt et al. |
| 8,219,172 B2 | 7/2012 | Schurman et al. |
| 8,224,411 B2 | 7/2012 | Al-Ali et al. |
| 8,229,532 B2 | 7/2012 | Davis |
| 8,233,955 B2 | 7/2012 | Al-Ali et al. |
| 8,255,026 B1 | 8/2012 | Al-Ali |
| 8,265,723 B1 | 9/2012 | McHale et al. |
| 8,274,360 B2 | 9/2012 | Sampath et al. |
| 8,280,473 B2 | 10/2012 | Al-Ali |
| 8,315,683 B2 | 11/2012 | Al-Ali et al. |
| RE43,860 E | 12/2012 | Parker |
| 8,346,330 B2 | 1/2013 | Lamego |
| 8,353,842 B2 | 1/2013 | Al-Ali et al. |
| 8,355,766 B2 | 1/2013 | MacNeish, III et al. |
| 8,374,665 B2 | 2/2013 | Lamego |
| 8,388,353 B2 | 3/2013 | Kiani et al. |
| 8,398,424 B1 * | 3/2013 | Vasavda ............... H01R 13/639 439/371 |
| 8,401,602 B2 | 3/2013 | Kiani |
| 8,414,499 B2 | 4/2013 | Al-Ali et al. |
| 8,418,524 B2 | 4/2013 | Al-Ali |
| 8,428,967 B2 | 4/2013 | Olsen et al. |
| 8,430,817 B1 | 4/2013 | Al-Ali et al. |
| 8,437,825 B2 | 5/2013 | Dalvi et al. |
| 8,455,290 B2 | 6/2013 | Siskavich |
| 8,457,707 B2 | 6/2013 | Kiani |
| 8,471,713 B2 | 6/2013 | Poeze et al. |
| 8,473,020 B2 | 6/2013 | Kiani et al. |
| 8,509,867 B2 | 8/2013 | Workman et al. |
| 8,515,509 B2 | 8/2013 | Bruinsma et al. |
| 8,523,781 B2 | 9/2013 | Al-Ali |
| D692,145 S | 10/2013 | Al-Ali et al. |
| 8,571,617 B2 | 10/2013 | Reichgott et al. |
| 8,571,618 B1 | 10/2013 | Lamego et al. |
| 8,571,619 B2 | 10/2013 | Al-Ali et al. |
| 8,577,431 B2 | 11/2013 | Lamego et al. |
| 8,584,345 B2 | 11/2013 | Al-Ali et al. |
| 8,588,880 B2 | 11/2013 | Abdul-Hafiz et al. |
| 8,630,691 B2 | 1/2014 | Lamego et al. |
| 8,641,631 B2 | 2/2014 | Sierra et al. |
| 8,652,060 B2 | 2/2014 | Ai-Ali |
| 8,666,468 B1 | 3/2014 | Ai-Ali |
| 8,670,811 B2 | 3/2014 | O'Reilly |
| RE44,823 E | 4/2014 | Parker |
| RE44,875 E | 4/2014 | Kiani et al. |
| 8,688,183 B2 | 4/2014 | Bruinsma et al. |
| 8,690,799 B2 | 4/2014 | Telfort et al. |
| 8,702,627 B2 | 4/2014 | Telfort et al. |
| 8,712,494 B1 | 4/2014 | MacNeish, III et al. |
| 8,715,206 B2 | 5/2014 | Telfort et al. |
| 8,723,677 B1 | 5/2014 | Kiani |
| 8,740,792 B1 | 6/2014 | Kiani et al. |
| 8,755,535 B2 | 6/2014 | Telfort et al. |
| 8,755,872 B1 | 6/2014 | Marinow |
| 8,764,671 B2 | 7/2014 | Kiani |
| 8,768,423 B2 | 7/2014 | Shakespeare et al. |
| 8,771,204 B2 | 7/2014 | Telfort et al. |
| 8,781,544 B2 | 7/2014 | Al-Ali et al. |
| 8,790,268 B2 | 7/2014 | Al-Ali |
| 8,801,613 B2 | 8/2014 | Al-Ali et al. |
| 8,821,397 B2 | 9/2014 | Al-Ali et al. |
| 8,821,415 B2 | 9/2014 | Al-Ali et al. |
| 8,830,449 B1 | 9/2014 | Lamego et al. |
| 8,840,549 B2 | 9/2014 | Al-Ali et al. |
| 8,850,675 B2 * | 10/2014 | Frydlewski ........... A43B 3/0078 24/712 |
| 8,852,094 B2 | 10/2014 | Al-Ali et al. |
| 8,852,994 B2 | 10/2014 | Wojtczuk et al. |
| 8,897,847 B2 | 11/2014 | Al-Ali |
| 8,911,377 B2 | 12/2014 | Al-Ali |
| 8,989,831 B2 | 3/2015 | Al-Ali et al. |
| 8,998,809 B2 | 4/2015 | Kiani |
| 9,066,666 B2 | 6/2015 | Kiani |
| 9,066,680 B1 | 6/2015 | Al-Ali et al. |
| 9,095,316 B2 | 8/2015 | Welch et al. |
| 9,106,038 B2 | 8/2015 | Telfort et al. |
| 9,107,625 B2 | 8/2015 | Telfort et al. |
| 9,114,749 B2 | 8/2015 | Ashliman et al. |
| 9,131,881 B2 | 9/2015 | Diab et al. |
| 9,138,180 B1 | 9/2015 | Coverston et al. |
| 9,153,112 B1 | 10/2015 | Kiani et al. |
| 9,192,329 B2 | 11/2015 | Ai-Ali |
| 9,192,351 B1 | 11/2015 | Telfort et al. |
| 9,195,385 B2 | 11/2015 | Al-Ali et al. |
| 9,211,095 B1 | 12/2015 | Al-Ali |
| 9,218,454 B2 | 12/2015 | Kiani et al. |
| 9,245,668 B1 | 1/2016 | Vo et al. |
| 9,267,572 B2 | 2/2016 | Barker et al. |
| 9,277,880 B2 | 3/2016 | Poeze et al. |
| 9,307,928 B1 | 4/2016 | Al-Ali et al. |
| 9,323,894 B2 | 4/2016 | Kiani |
| D755,392 S | 5/2016 | Hwang et al. |
| 9,326,712 B1 | 5/2016 | Kiani |
| 9,392,945 B2 | 7/2016 | Al-Ali et al. |
| 9,408,542 B1 | 8/2016 | Kinast et al. |
| 9,436,645 B2 | 9/2016 | Al-Ali et al. |
| 9,445,759 B1 | 9/2016 | Lamego et al. |
| 9,468,266 B2 * | 10/2016 | Ducauchuis ......... A44B 18/0053 |
| 9,474,474 B2 | 10/2016 | Lamego et al. |
| 9,480,435 B2 | 11/2016 | Olsen |
| 9,510,779 B2 | 12/2016 | Poeze et al. |
| 9,517,024 B2 | 12/2016 | Kiani et al. |
| 9,532,722 B2 | 1/2017 | Lamego et al. |
| 9,560,996 B2 | 2/2017 | Kiani |
| 9,579,039 B2 | 2/2017 | Jansen et al. |
| 9,622,692 B2 | 4/2017 | Lamego et al. |
| D788,312 S | 5/2017 | Al-Ali et al. |
| 9,649,054 B2 | 5/2017 | Lamego et al. |
| 9,697,928 B2 | 7/2017 | Al-Ali et al. |
| 9,717,458 B2 | 8/2017 | Lamego et al. |
| 9,724,016 B1 | 8/2017 | Al-Ali et al. |
| 9,724,024 B2 | 8/2017 | Al-Ali |
| 9,724,025 B1 | 8/2017 | Kiani et al. |
| 9,749,232 B2 | 8/2017 | Sampath et al. |
| 9,750,442 B2 | 9/2017 | Olsen |
| 9,750,461 B1 | 9/2017 | Telfort |

(56) References Cited

U.S. PATENT DOCUMENTS

| | | |
|---|---|---|
| 9,775,545 B2 | 10/2017 | Al-Ali et al. |
| 9,778,079 B1 | 10/2017 | Al-Ali et al. |
| 9,782,077 B2 | 10/2017 | Lamego et al. |
| 9,787,568 B2 | 10/2017 | Lamego et al. |
| 9,808,188 B1 | 11/2017 | Perea et al. |
| 9,839,379 B2 | 12/2017 | Al-Ali et al. |
| 9,839,381 B1 | 12/2017 | Weber et al. |
| 9,847,749 B2 | 12/2017 | Kiani et al. |
| 9,848,800 B1 | 12/2017 | Lee et al. |
| 9,861,298 B2 | 1/2018 | Eckerbom et al. |
| 9,861,305 B1 | 1/2018 | Weber et al. |
| 9,877,650 B2 | 1/2018 | Muhsin et al. |
| 9,891,079 B2 | 2/2018 | Dalvi |
| 9,924,897 B1 | 3/2018 | Abdul-Hafiz |
| 9,936,917 B2 | 4/2018 | Poeze et al. |
| 9,955,937 B2 | 5/2018 | Telfort |
| 9,965,946 B2 | 5/2018 | Al-Ali et al. |
| D820,865 S | 6/2018 | Muhsin et al. |
| 9,986,952 B2 | 6/2018 | Dalvi et al. |
| D822,215 S | 7/2018 | Al-Ali et al. |
| D822,216 S | 7/2018 | Barker et al. |
| 10,010,276 B2 | 7/2018 | Al-Ali et al. |
| 10,086,138 B1 | 10/2018 | Novak, Jr. |
| 10,111,591 B2 | 10/2018 | Dyell et al. |
| D833,624 S | 11/2018 | DeJong et al. |
| 10,123,729 B2 | 11/2018 | Dyell et al. |
| D835,282 S | 12/2018 | Barker et al. |
| D835,283 S | 12/2018 | Barker et al. |
| D835,284 S | 12/2018 | Barker et al. |
| D835,285 S | 12/2018 | Barker et al. |
| 10,149,616 B2 | 12/2018 | Al-Ali et al. |
| 10,154,815 B2 | 12/2018 | Al-Ali et al. |
| 10,159,412 B2 | 12/2018 | Lamego et al. |
| 10,188,348 B2 | 1/2019 | Al-Ali et al. |
| RE47,218 E | 2/2019 | Al-Ali |
| RE47,244 E | 2/2019 | Kiani et al. |
| RE47,249 E | 2/2019 | Kiani et al. |
| 10,205,291 B2 | 2/2019 | Scruggs et al. |
| 10,226,187 B2 | 3/2019 | Al-Ali et al. |
| 10,231,657 B2 | 3/2019 | Al-Ali et al. |
| 10,231,670 B2 | 3/2019 | Blank et al. |
| RE47,353 E | 4/2019 | Kiani et al. |
| 10,279,247 B2 | 5/2019 | Kiani |
| 10,292,664 B2 | 5/2019 | Ai-Ali |
| 10,299,720 B2 | 5/2019 | Brown et al. |
| 10,327,337 B2 | 6/2019 | Schmidt et al. |
| 10,327,713 B2 | 6/2019 | Barker et al. |
| 10,332,630 B2 | 6/2019 | Al-Ali |
| 10,383,520 B2 | 8/2019 | Wojtczuk et al. |
| 10,383,527 B2 | 8/2019 | Al-Ali |
| 10,388,120 B2 | 8/2019 | Muhsin et al. |
| D864,120 S | 10/2019 | Forrest et al. |
| 10,441,181 B1 | 10/2019 | Telfort et al. |
| 10,441,196 B2 | 10/2019 | Eckerbom et al. |
| 10,448,844 B2 | 10/2019 | Al-Ali et al. |
| 10,448,871 B2 | 10/2019 | Al-Ali et al. |
| 10,456,038 B2 | 10/2019 | Lamego et al. |
| 10,463,340 B2 | 11/2019 | Telfort et al. |
| 10,471,159 B1 | 11/2019 | Lapotko et al. |
| 10,505,311 B2 | 12/2019 | Al-Ali et al. |
| 10,524,738 B2 | 1/2020 | Olsen |
| 10,532,174 B2 | 1/2020 | Ai-Ali |
| 10,537,285 B2 | 1/2020 | Shreim et al. |
| 10,542,903 B2 | 1/2020 | Al-Ali et al. |
| 10,555,678 B2 | 2/2020 | Dalvi et al. |
| 10,568,553 B2 | 2/2020 | O'Neil et al. |
| 10,608,817 B2 | 3/2020 | Haider et al. |
| D880,477 S | 4/2020 | Forrest et al. |
| 10,617,302 B2 | 4/2020 | Al-Ali et al. |
| 10,617,335 B2 | 4/2020 | Al-Ali et al. |
| 10,637,181 B2 | 4/2020 | Al-Ali et al. |
| D886,849 S | 6/2020 | Muhsin et al. |
| D887,548 S | 6/2020 | Abdul-Hafiz et al. |
| D887,549 S | 6/2020 | Abdul-Hafiz et al. |
| 10,667,764 B2 | 6/2020 | Ahmed et al. |
| D890,708 S | 7/2020 | Forrest et al. |
| 10,721,785 B2 | 7/2020 | Al-Ali |
| 10,736,518 B2 | 8/2020 | Al-Ali et al. |
| 10,750,984 B2 | 8/2020 | Pauley et al. |
| D897,098 S | 9/2020 | Al-Ali |
| 10,779,098 B2 | 9/2020 | Iswanto et al. |
| 10,827,961 B1 | 11/2020 | Iyengar et al. |
| 10,828,007 B1 | 11/2020 | Telfort et al. |
| 10,832,818 B2 | 11/2020 | Muhsin et al. |
| 10,849,554 B2 | 12/2020 | Shreim et al. |
| 10,856,750 B2 | 12/2020 | Indorf et al. |
| D906,970 S | 1/2021 | Forrest et al. |
| D908,213 S | 1/2021 | Abdul-Hafiz et al. |
| 10,916,882 B2 | 2/2021 | Barker et al. |
| 10,918,281 B2 | 2/2021 | Al-Ali et al. |
| 10,932,705 B2 | 3/2021 | Muhsin et al. |
| 10,932,729 B2 | 3/2021 | Kiani et al. |
| 10,939,878 B2 | 3/2021 | Kiani et al. |
| 10,956,950 B2 | 3/2021 | Al-Ali et al. |
| D916,135 S | 4/2021 | Indorf et al. |
| D917,046 S | 4/2021 | Abdul-Hafiz et al. |
| D917,550 S | 4/2021 | Indorf et al. |
| D917,564 S | 4/2021 | Indorf et al. |
| D917,704 S | 4/2021 | Al-Ali et al. |
| 10,987,066 B2 | 4/2021 | Chandran et al. |
| 10,991,135 B2 | 4/2021 | Al-Ali et al. |
| D919,094 S | 5/2021 | Al-Ali et al. |
| D919,100 S | 5/2021 | Al-Ali et al. |
| 11,006,867 B2 | 5/2021 | Al-Ali |
| D921,202 S | 6/2021 | Al-Ali et al. |
| 11,024,064 B2 | 6/2021 | Muhsin et al. |
| 11,026,604 B2 | 6/2021 | Chen et al. |
| D925,597 S | 7/2021 | Chandran et al. |
| D927,699 S | 8/2021 | Al-Ali et al. |
| 11,076,777 B2 | 8/2021 | Lee et al. |
| 11,114,188 B2 | 9/2021 | Poeze et al. |
| D933,232 S | 10/2021 | Al-Ali et al. |
| D933,233 S | 10/2021 | Al-Ali et al. |
| D933,234 S | 10/2021 | Al-Ali et al. |
| 11,145,408 B2 | 10/2021 | Sampath et al. |
| 11,147,518 B1 | 10/2021 | Al-Ali et al. |
| 11,185,262 B2 | 11/2021 | Al-Ali et al. |
| 11,191,484 B2 | 12/2021 | Kiani et al. |
| D946,596 S | 3/2022 | Ahmed |
| D946,597 S | 3/2022 | Ahmed |
| D946,598 S | 3/2022 | Ahmed |
| D946,617 S | 3/2022 | Ahmed |
| 11,272,839 B2 | 3/2022 | Al-Ali et al. |
| 11,289,199 B2 | 3/2022 | Al-Ali |
| RE49,034 E | 4/2022 | Al-Ali |
| 11,298,021 B2 | 4/2022 | Muhsin et al. |
| D950,580 S | 5/2022 | Ahmed |
| D950,599 S | 5/2022 | Ahmed |
| D950,738 S | 5/2022 | Al-Ali et al. |
| D957,648 S | 7/2022 | Al-Ali |
| 11,382,567 B2 | 7/2022 | O'Brien et al. |
| 11,389,093 B2 | 7/2022 | Triman et al. |
| 11,406,286 B2 | 8/2022 | Al-Ali et al. |
| 11,417,426 B2 | 8/2022 | Muhsin et al. |
| 11,439,329 B2 | 9/2022 | Lamego |
| 11,445,948 B2 | 9/2022 | Scruggs et al. |
| D965,789 S | 10/2022 | Al-Ali et al. |
| D967,433 S | 10/2022 | Al-Ali et al. |
| 11,464,410 B2 | 10/2022 | Muhsin |
| 11,504,058 B1 | 11/2022 | Sharma et al. |
| 11,504,066 B1 | 11/2022 | Dalvi et al. |
| D971,933 S | 12/2022 | Ahmed |
| D973,072 S | 12/2022 | Ahmed |
| D973,685 S | 12/2022 | Ahmed |
| D973,686 S | 12/2022 | Ahmed |
| D974,193 S | 1/2023 | Forrest et al. |
| D979,516 S | 2/2023 | Al-Ali et al. |
| D980,091 S | 3/2023 | Forrest et al. |
| 11,596,363 B2 | 3/2023 | Lamego |
| 11,627,919 B2 | 4/2023 | Kiani et al. |
| 11,637,437 B2 | 4/2023 | Al-Ali et al. |
| D985,498 S | 5/2023 | Al-Ali et al. |
| 11,653,862 B2 | 5/2023 | Dalvi et al. |
| D989,112 S | 6/2023 | Muhsin et al. |

(56) References Cited

U.S. PATENT DOCUMENTS

| | | |
|---|---|---|
| D989,327 S | 6/2023 | Al-Ali et al. |
| 11,678,829 B2 | 6/2023 | Al-Ali et al. |
| 11,679,579 B2 | 6/2023 | Al-Ali |
| 11,684,296 B2 | 6/2023 | Vo et al. |
| 11,692,934 B2 | 7/2023 | Normand et al. |
| D997,365 S | 8/2023 | Hwang |
| 11,721,105 B2 | 8/2023 | Ranasinghe et al. |
| 11,730,379 B2 | 8/2023 | Ahmed et al. |
| D998,625 S | 9/2023 | Indorf et al. |
| D998,630 S | 9/2023 | Indorf et al. |
| D998,631 S | 9/2023 | Indorf et al. |
| D999,244 S | 9/2023 | Indorf et al. |
| D999,245 S | 9/2023 | Indorf et al. |
| D999,246 S | 9/2023 | Indorf et al. |
| 11,766,198 B2 | 9/2023 | Pauley et al. |
| D1,000,975 S | 10/2023 | Al-Ali et al. |
| 11,803,623 B2 | 10/2023 | Kiani et al. |
| 11,832,940 B2 | 12/2023 | Diab et al. |
| 2001/0034477 A1 | 10/2001 | Mansfield et al. |
| 2001/0039483 A1 | 11/2001 | Brand et al. |
| 2002/0010401 A1 | 1/2002 | Bushmakin et al. |
| 2002/0058864 A1 | 5/2002 | Mansfield et al. |
| 2002/0133080 A1 | 9/2002 | Apruzzese et al. |
| 2003/0013975 A1 | 1/2003 | Kiani |
| 2003/0018243 A1 | 1/2003 | Gerhardt et al. |
| 2003/0144582 A1 | 7/2003 | Cohen et al. |
| 2003/0156288 A1 | 8/2003 | Barnum et al. |
| 2003/0212312 A1 | 11/2003 | Coffin, IV et al. |
| 2004/0008839 A1 | 1/2004 | Jozitis et al. |
| 2004/0078929 A1 | 4/2004 | Schoemann |
| 2004/0106163 A1 | 6/2004 | Workman, Jr. et al. |
| 2005/0055276 A1 | 3/2005 | Kiani et al. |
| 2005/0234317 A1 | 10/2005 | Kiani |
| 2006/0073719 A1 | 4/2006 | Kiani |
| 2006/0189871 A1 | 8/2006 | Al-Ali et al. |
| 2007/0073116 A1 | 3/2007 | Kiani et al. |
| 2007/0180140 A1 | 8/2007 | Welch et al. |
| 2007/0244377 A1 | 10/2007 | Cozad et al. |
| 2008/0064965 A1 | 3/2008 | Jay et al. |
| 2008/0094228 A1 | 4/2008 | Welch et al. |
| 2008/0103375 A1 | 5/2008 | Kiani |
| 2008/0221418 A1 | 9/2008 | Al-Ali et al. |
| 2009/0036759 A1 | 2/2009 | Ault et al. |
| 2009/0093687 A1 | 4/2009 | Telfort et al. |
| 2009/0095926 A1 | 4/2009 | MacNeish, III |
| 2009/0247984 A1 | 10/2009 | Lamego et al. |
| 2009/0275844 A1 | 11/2009 | Al-Ali |
| 2010/0004518 A1 | 1/2010 | Vo et al. |
| 2010/0030040 A1 | 2/2010 | Poeze et al. |
| 2010/0099964 A1 | 4/2010 | O'Reilly et al. |
| 2010/0234718 A1 | 9/2010 | Sampath et al. |
| 2010/0270257 A1 | 10/2010 | Wachman et al. |
| 2011/0028806 A1 | 2/2011 | Merritt et al. |
| 2011/0028809 A1 | 2/2011 | Goodman |
| 2011/0040197 A1 | 2/2011 | Welch et al. |
| 2011/0082711 A1 | 4/2011 | Poeze et al. |
| 2011/0087081 A1 | 4/2011 | Kiani et al. |
| 2011/0118561 A1 | 5/2011 | Tari et al. |
| 2011/0137297 A1 | 6/2011 | Kiani et al. |
| 2011/0172498 A1 | 7/2011 | Olsen et al. |
| 2012/0123231 A1 | 5/2012 | O'Reilly |
| 2012/0165629 A1 | 6/2012 | Merritt et al. |
| 2012/0209084 A1 | 8/2012 | Olsen et al. |
| 2012/0226117 A1 | 9/2012 | Lamego et al. |
| 2012/0283524 A1 | 11/2012 | Kiani et al. |
| 2013/0023775 A1 | 1/2013 | Lamego et al. |
| 2013/0060147 A1 | 3/2013 | Welch et al. |
| 2013/0096405 A1 | 4/2013 | Garfio |
| 2013/0296672 A1 | 11/2013 | O'Neil et al. |
| 2013/0345921 A1 | 12/2013 | Al-Ali et al. |
| 2014/0166076 A1 | 6/2014 | Kiani et al. |
| 2014/0180160 A1 | 6/2014 | Brown et al. |
| 2014/0187973 A1 | 7/2014 | Brown et al. |
| 2014/0275871 A1 | 9/2014 | Lamego et al. |
| 2014/0275872 A1 | 9/2014 | Merritt et al. |
| 2014/0316217 A1 | 10/2014 | Purdon et al. |
| 2014/0316218 A1 | 10/2014 | Purdon et al. |
| 2014/0323897 A1 | 10/2014 | Brown et al. |
| 2014/0323898 A1 | 10/2014 | Purdon et al. |
| 2015/0005600 A1 | 1/2015 | Blank et al. |
| 2015/0011907 A1 | 1/2015 | Purdon et al. |
| 2015/0073241 A1 | 3/2015 | Lamego |
| 2015/0080754 A1 | 3/2015 | Purdon et al. |
| 2015/0099950 A1 | 4/2015 | Al-Ali et al. |
| 2016/0196388 A1 | 7/2016 | Lamego |
| 2016/0367173 A1 | 12/2016 | Dalvi et al. |
| 2017/0024748 A1 | 1/2017 | Haider |
| 2017/0173632 A1 | 6/2017 | Al-Ali |
| 2017/0251974 A1 | 9/2017 | Shreim et al. |
| 2018/0242926 A1 | 8/2018 | Muhsin et al. |
| 2018/0247712 A1 | 8/2018 | Muhsin et al. |
| 2019/0239787 A1 | 8/2019 | Pauley et al. |
| 2019/0320906 A1 | 10/2019 | Olsen |
| 2019/0374713 A1 | 12/2019 | Kiani et al. |
| 2020/0060869 A1 | 2/2020 | Telfort et al. |
| 2020/0111552 A1 | 4/2020 | Ahmed |
| 2020/0113520 A1 | 4/2020 | Abdul-Hafiz et al. |
| 2020/0138368 A1 | 5/2020 | Kiani et al. |
| 2020/0163597 A1 | 5/2020 | Dalvi et al. |
| 2020/0196877 A1 | 6/2020 | Vo et al. |
| 2020/0253474 A1 | 8/2020 | Muhsin et al. |
| 2020/0253544 A1 | 8/2020 | Belur Nagaraj et al. |
| 2020/0275841 A1 | 9/2020 | Telfort et al. |
| 2020/0288983 A1 | 9/2020 | Telfort et al. |
| 2020/0321793 A1 | 10/2020 | Al-Ali et al. |
| 2020/0329983 A1 | 10/2020 | Al-Ali et al. |
| 2020/0329984 A1 | 10/2020 | Al-Ali et al. |
| 2020/0329993 A1 | 10/2020 | Al-Ali et al. |
| 2020/0330037 A1 | 10/2020 | Al-Ali et al. |
| 2021/0022628 A1 | 1/2021 | Telfort et al. |
| 2021/0104173 A1 | 4/2021 | Pauley et al. |
| 2021/0113121 A1 | 4/2021 | Diab et al. |
| 2021/0117525 A1 | 4/2021 | Kiani et al. |
| 2021/0118581 A1 | 4/2021 | Kiani et al. |
| 2021/0121582 A1 | 4/2021 | Krishnamani et al. |
| 2021/0161465 A1 | 6/2021 | Barker et al. |
| 2021/0236729 A1 | 8/2021 | Kiani et al. |
| 2021/0256267 A1 | 8/2021 | Ranasinghe et al. |
| 2021/0256835 A1 | 8/2021 | Ranasinghe et al. |
| 2021/0275101 A1 | 9/2021 | Vo et al. |
| 2021/0290060 A1 | 9/2021 | Ahmed |
| 2021/0290072 A1 | 9/2021 | Forrest |
| 2021/0290080 A1 | 9/2021 | Ahmed |
| 2021/0290120 A1 | 9/2021 | Ai-Ali |
| 2021/0290177 A1 | 9/2021 | Novak, Jr. |
| 2021/0290184 A1 | 9/2021 | Ahmed |
| 2021/0296008 A1 | 9/2021 | Novak, Jr. |
| 2021/0330228 A1 | 10/2021 | Olsen et al. |
| 2021/0386382 A1 | 12/2021 | Olsen et al. |
| 2021/0402110 A1 | 12/2021 | Pauley et al. |
| 2022/0026355 A1 | 1/2022 | Normand et al. |
| 2022/0039707 A1 | 2/2022 | Sharma et al. |
| 2022/0053892 A1 | 2/2022 | Al-Ali et al. |
| 2022/0071562 A1 | 3/2022 | Kiani |
| 2022/0096603 A1 | 3/2022 | Kiani et al. |
| 2022/0151521 A1 | 5/2022 | Krishnamani et al. |
| 2022/0218244 A1 | 7/2022 | Kiani et al. |
| 2022/0287574 A1 | 9/2022 | Telfort et al. |
| 2022/0296161 A1 | 9/2022 | Al-Ali et al. |
| 2022/0361819 A1 | 11/2022 | Al-Ali et al. |
| 2022/0379059 A1 | 12/2022 | Yu et al. |
| 2022/0392610 A1 | 12/2022 | Kiani et al. |
| 2023/0028745 A1 | 1/2023 | Al-Ali |
| 2023/0038389 A1 | 2/2023 | Vo |
| 2023/0045647 A1 | 2/2023 | Vo |
| 2023/0058052 A1 | 2/2023 | Ai-Ali |
| 2023/0058342 A1 | 2/2023 | Kiani |
| 2023/0069789 A1 | 3/2023 | Koo et al. |
| 2023/0087671 A1 | 3/2023 | Telfort et al. |
| 2023/0110152 A1 | 4/2023 | Forrest et al. |
| 2023/0111198 A1 | 4/2023 | Yu et al. |
| 2023/0115397 A1 | 4/2023 | Vo et al. |
| 2023/0116371 A1 | 4/2023 | Mills et al. |
| 2023/0135297 A1 | 5/2023 | Kiani et al. |

(56) References Cited

U.S. PATENT DOCUMENTS

| | | |
|---|---|---|
| 2023/0138098 A1 | 5/2023 | Telfort et al. |
| 2023/0145155 A1 | 5/2023 | Krishnamani et al. |
| 2023/0147750 A1 | 5/2023 | Barker et al. |
| 2023/0210417 A1 | 7/2023 | Al-Ali et al. |
| 2023/0222805 A1 | 7/2023 | Muhsin et al. |
| 2023/0222887 A1 | 7/2023 | Muhsin et al. |
| 2023/0226331 A1 | 7/2023 | Kiani et al. |
| 2023/0284916 A1 | 9/2023 | Telfort |
| 2023/0284943 A1 | 9/2023 | Scruggs et al. |
| 2023/0301562 A1 | 9/2023 | Scruggs et al. |
| 2023/0346993 A1 | 11/2023 | Kiani et al. |
| 2023/0368221 A1 | 11/2023 | Haider |
| 2023/0371893 A1 | 11/2023 | Al-Ali et al. |
| 2023/0389837 A1 | 12/2023 | Krishnamani et al. |

\* cited by examiner

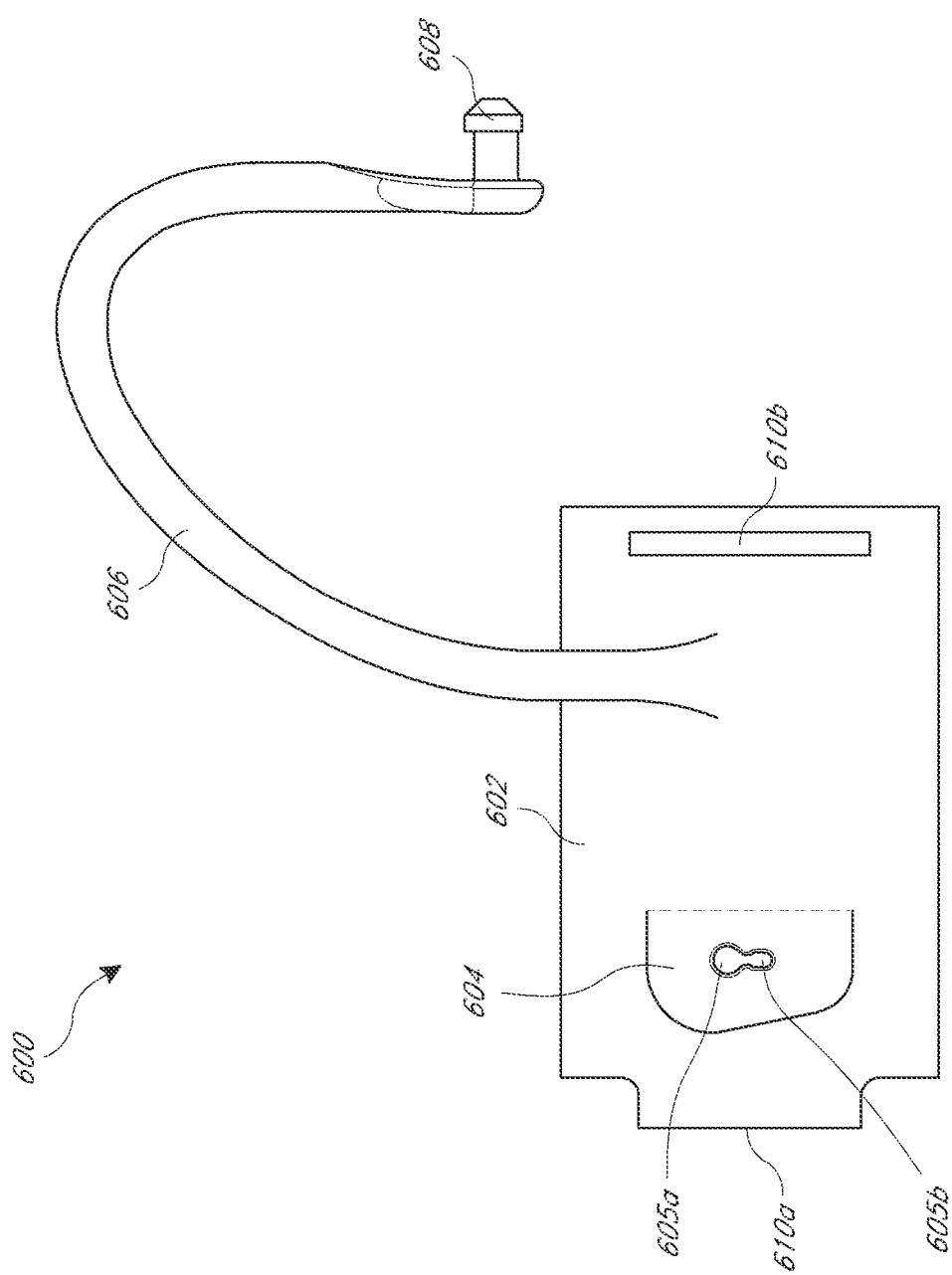

CABLE TETHER SYSTEM

CROSS-REFERENCE TO RELATED APPLICATIONS

The present application is a continuation of U.S. patent application Ser. No. 15/018,745, filed Feb. 8, 2016, titled CABLE TETHER SYSTEM, which is a continuation of U.S. patent application Ser. No. 13/762,062, filed Feb. 7, 2013, titled CABLE TETHER SYSTEM, which claims priority benefit to U.S. Prov. App. No. 61/596,555, filed Feb. 8, 2012, entitled CABLE TETHER SYSTEM, each of which is hereby incorporated herein by reference in its entirety.

BACKGROUND

Cables have become ubiquitous as electronic devices are used throughout commercial and non-commercial areas. The cables associated with these electronic devices are used to transmit data and/or electricity to and from the electronic device. In some fields, such as medical devices, cables are specifically configured to be used with particular medical devices and can be expensive.

In many instances, a cable from one electronic device is connected to a cable from another electronic device. For instance, disposable pulse oximeter sensors are often attached to a cable, which in turn is attached to another cable from the pulse oximeter. When the disposable pulse oximeter sensors are discarded, the removable cables are often unnecessarily discarded as well. This can increase costs as the cables are later replaced.

BRIEF DESCRIPTION OF THE DRAWINGS

FIGS. 3, 4A, 4B, 5, 6A, 6B, and 7 are perspective views of different embodiments of a cable tether system.

DETAILED DESCRIPTION

Figure 1A:
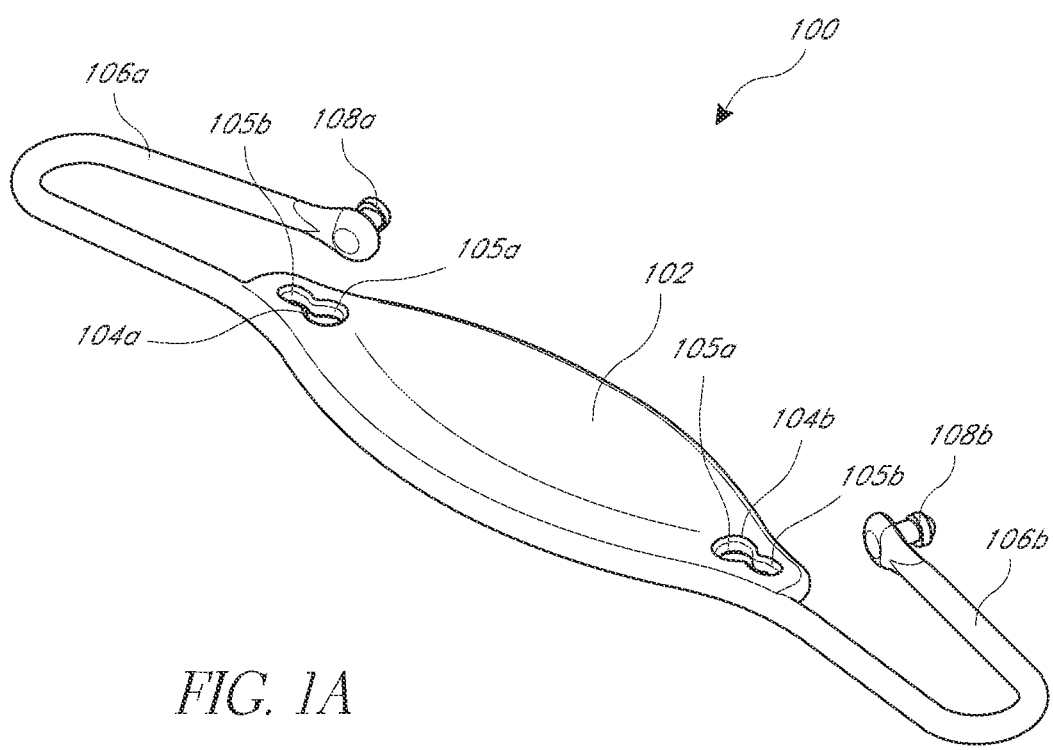
FIGS. 1A-B are perspective views of an embodiment of a cable tether system.
Figure 1B:
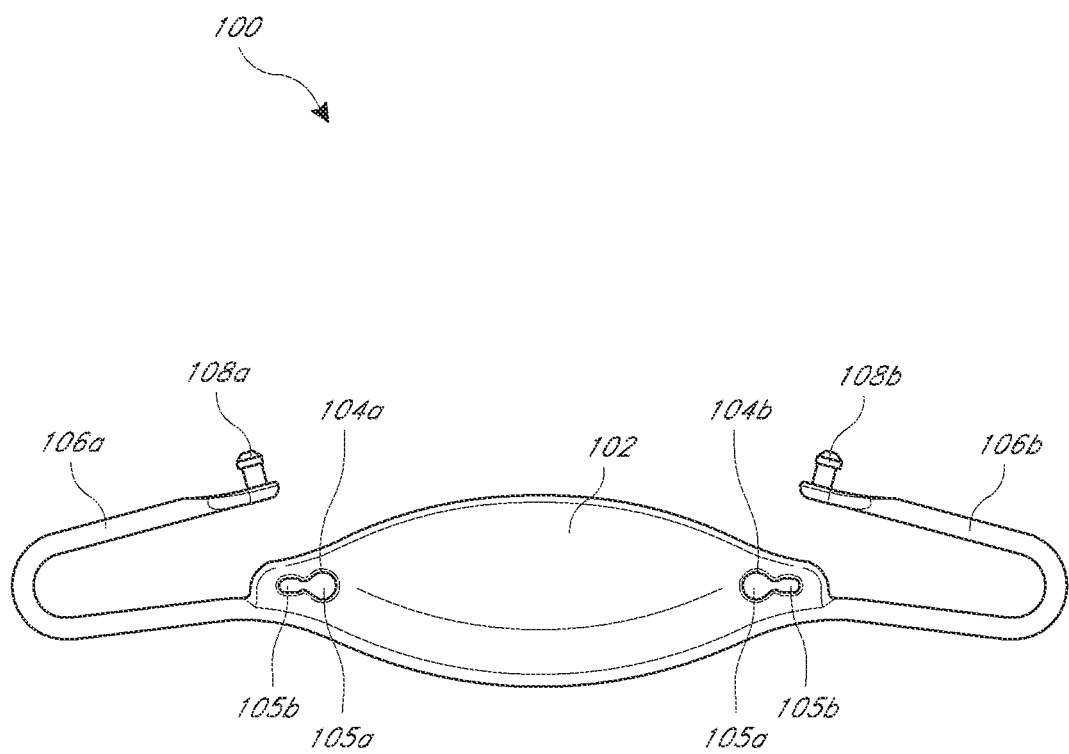

FIGS. 1A and 1B are perspective views of an embodiment of a cable tether system 100. The cable tether system 100 of the illustrated embodiment includes a base member 102 with engagement portions 104A, 104B, and elongate members 106A, 106B, each with an engagement portion 108A, 108B, respectively. The cable tether system 100 can be formed as a single molded piece or multiple individual pieces.

The base member 102 can be made of one or more pieces of plastic, such as elastomeric vinyl, or similar material, and can be made in a variety of shapes including, but not limited to oval, circle, triangle, quadrilateral, pentagon, hexagon, or other shape, as desired. In embodiments where the base member 102 is made of multiple pieces, the pieces can be laminated together or affixed to each other in some other way. Furthermore, the base member 102 can be as rigid or as flexible as desired. In some embodiments, the base member 102 is large enough to cover at least one side of the cable connectors when two cables are connected. In certain embodiments, the base member 102 is large enough to wrap around the cable connectors when the cables are connected. The base member 102 can provide a surface where additional information can be provided. For example, information regarding the cables' specifications, age, and their use can be provided on the base member 102. Additional information can be provided on the base member 102 in the form of words and/or images that the cables are not to be discarded, instructions for use, etc. The base member 102 can also be used to cover the ends of the cables to prevent wear.

The elongate members 106A, 106B can be located on opposite ends of the base member, as illustrated in FIG. 1A, or be on the same end or side. The elongate members 106A, 106B can be made from the same or different material as the base member 102. The elongate members 106A, 106B can be formed so as to be naturally rounded or naturally straight pieces that can be bent. In some embodiments, the elongate members 106A, 106B are less rigid and more flexible than the base member 102. Each elongate member 106A, 106B wraps around a different cable as will be described in greater detail below with reference to FIGS. 2A-2C. In some embodiments, the elongate members 106A, 106B can be shortened, tightened, or twisted, as desired, to more firmly secure the cables to the cable tether system 100.

In the illustrated embodiment, the base member 102 includes engagement portions 104A, 104B. Each engagement portion 104A, 104B includes a first cavity 105A for inserting the engagement portions 108A, 108B and a second cavity 105B for securing the engagement portions 108A, 108B. In some embodiments, the first cavity 105A is larger than the second cavity 105B. In certain embodiments the first cavity 105A is smaller than the second cavity 105B or is the same size.

In the illustrated embodiment, the engagement portions 104A, 104B are located at approximately opposite ends of the base member 102, however, the engagement portions 104A, 104B can be located elsewhere on the base member 102. For example, the engagement portions 104A, 104B can be located in the center or on the same end or side of the base member 102. In some embodiments, the engagement portions 104A, 104B include only one cavity each. In certain embodiments, the engagement portions 104A, 104B can be merged into a single engagement portion. In such embodiments, the single engagement portion can include a larger cavity to insert the engagement portions 108A, 108B and two smaller cavities on either side of the larger cavity to secure the engagement portions 108A, 108B. Alternatively, the engagement portions 104A, 104B can be located in the center as two protrusions that interact with the engagement portions 108A, 108B.

At the distal end of each elongate member 106A, 106B is located an engagement portion 108A, 108B, respectively. In some embodiments, the engagement portions 108A, 108B include a protrusion that interacts with cavities of the engagement portions 104A, 104B and can be used to secure the distal end of the of the elongate members 106A, 106B to the base member 102.

In the illustrated embodiment, each engagement portion 104A, 104B includes cavities 105A, 105B and the engagement portions 108A, 108B include protrusions, however, in some embodiments, the engagement portions 104A, 104B can include protrusions and the engagement portions 108A, 108B can include one or more cavities. Other configurations and materials can be used to form the engagement portions 104A, 104B, 108A, 108B, such as hook and loop fasteners, clamps, clasps, pins, buckles, hooks, screws, tape, string, wire, etc.

Figure 2A:
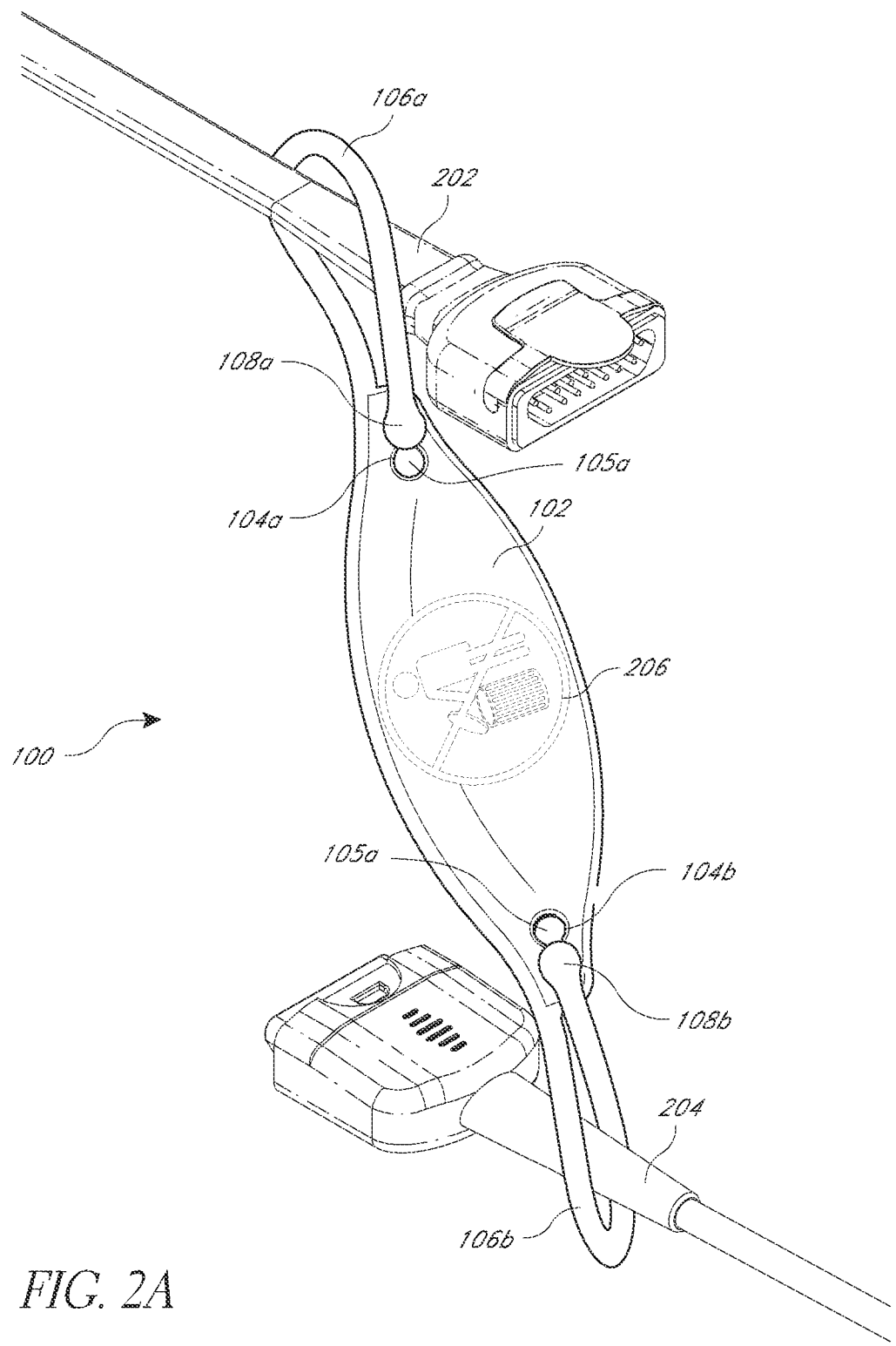
FIGS. 2A-2C are perspective views of an embodiment of a cable tether system connected to two cables.
Figure 2B:
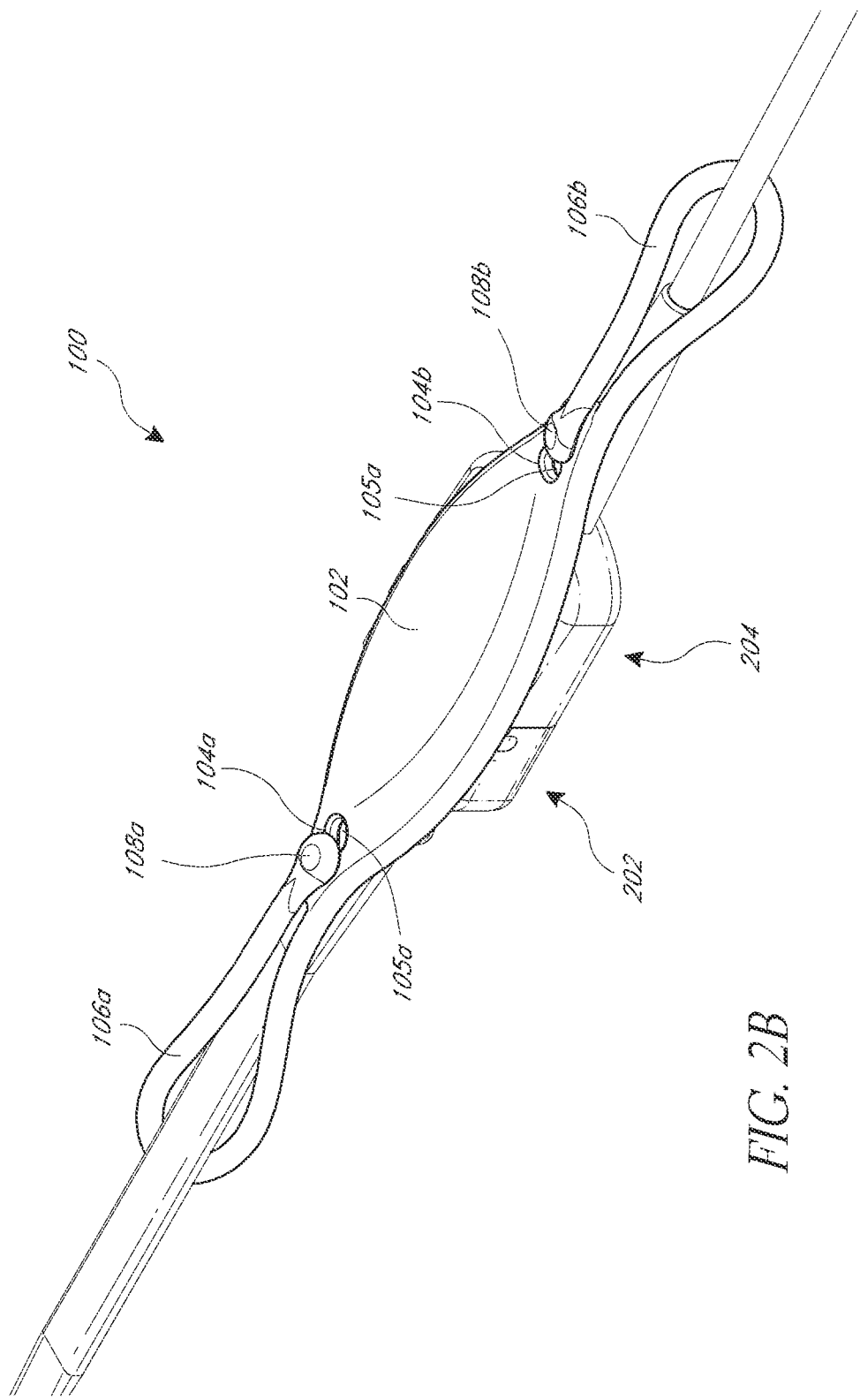
Figure 2C:
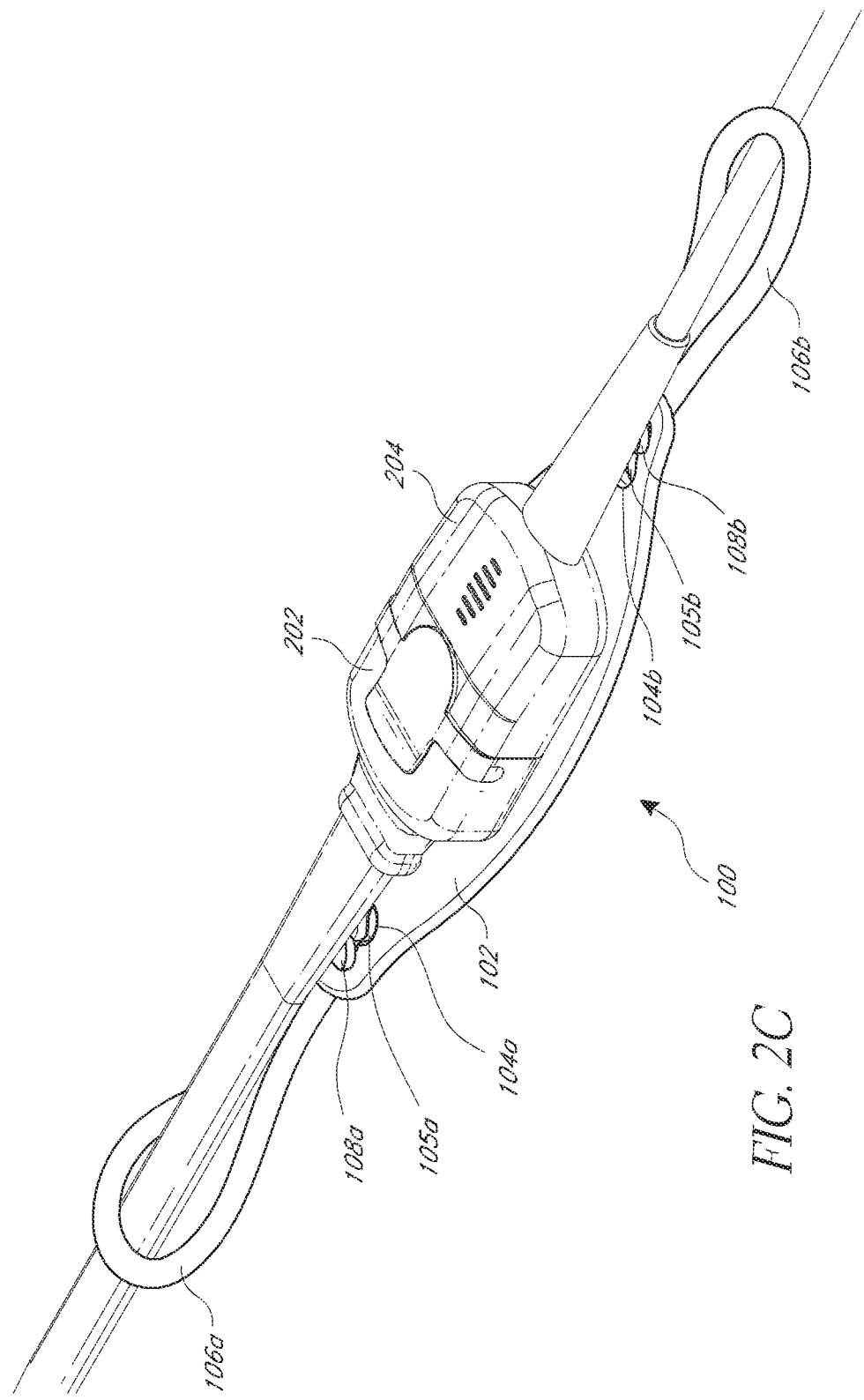

FIGS. 2A-2C are perspective views of an embodiment of the cable tether system 100 engaged with two cables 202, 204. As illustrated, the elongate members 106A, 106B wrap around the cables 202, 204, respectively, and the engagement portions 108A, 108B are secured, or locked, into position within the second cavity 105B (not seen) of the engagement portions 104A, 104B, thereby securing the cables 202, 204 to the cable tether system 100. In addition, the cable tether system 100 includes an image 206 printed on the base member 102 indicating that the cables are not to be discarded or removed. The image 206 can be pad printed with durable sublimating high contrast ink to increase its durability.

FIG. 2B is a top perspective view and FIG. 2C is a bottom perspective view of the cable tether system 100 engaged with the cables 202, 204 when the cables 202, 204 are connected. As illustrated, the elongate members 106A, 106B wrap around the cables 202, 204, respectively, and the engagement portions 108A, 108B are secured to the engagement portions 104A, 104B of the base member 102. In this way, the cables 202, 204 are secured to the cable tether system 100. In addition, in some embodiments, the base member 102 substantially covers at least one side of the cable connectors.

Figure 3:
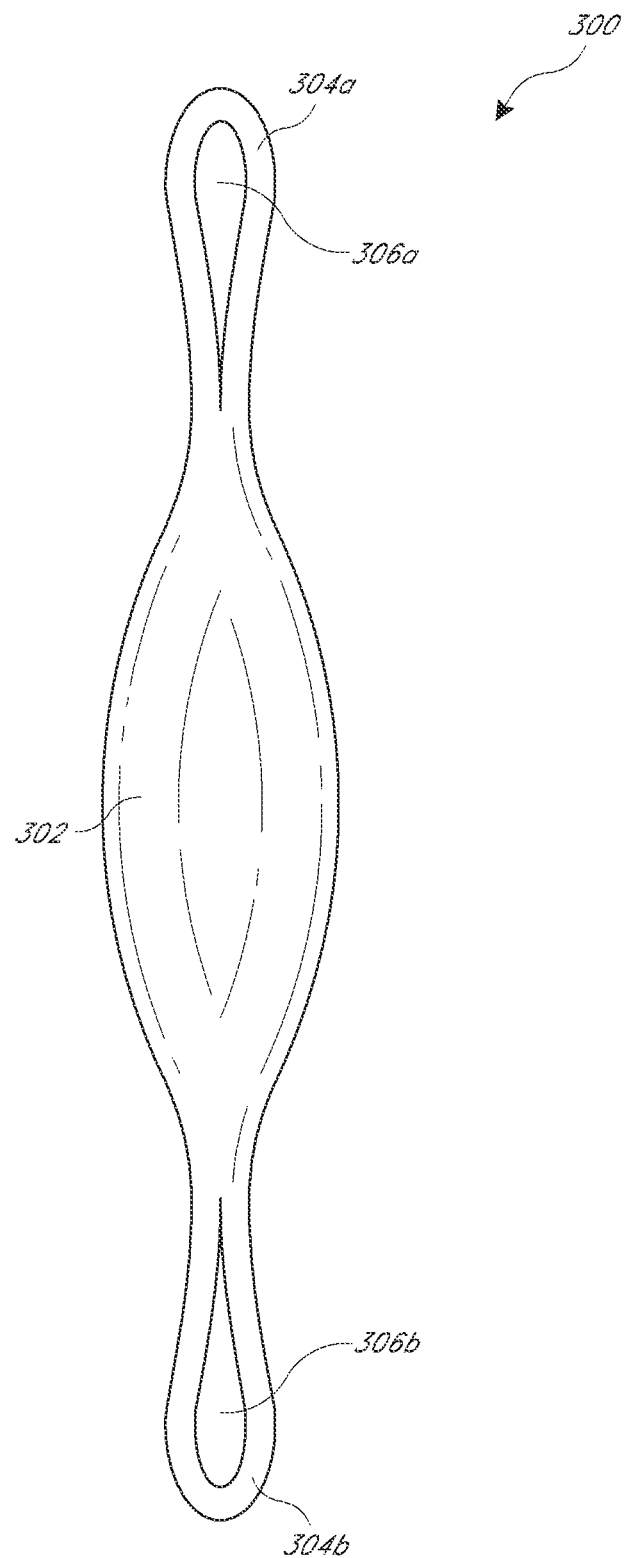

FIGS. 3, 4A, 4B, 5, 6A, 6B, and 7 are perspective views of various embodiments of a cable tether system. FIG. 3 is a perspective view of a cable tether system 300 that includes a base member 302, elongate members 304A, 304B, and cavities 306A, 306B. The base member 302 and elongate members 304A, 304B can be made of plastic, similar to the base member 102 and elongate members 106A, 106B of FIGS. 1A and 1B. In some embodiments, the cable tether system 300 does not include engagement portions.

In the illustrated embodiment, the elongate members 304A, 304B extend outward from the base member 302 in substantially opposite directions from one another, however, the elongate members can be positioned in a variety of different locations and can be located on the same side or end of the base member 302. In some embodiments, both ends of the elongate members 304A, 304B are affixed to the base member 302. In some embodiments, the elongate members 304A, 304B can be shortened, tightened, loosened, stretched, or lengthened, to alter the size of the cavities 306A, 306B.

To secure the cable tether system 300 to cables, the connector portions of the cables can be threaded through the cavities 306A, 306B, respectively. The cavities 306A, 306B can be sized so that the connectors cannot be easily removed once inserted. For example, the cavities 306A, 306B can be sized so that the connectors can more easily pass through the cavities 306A, 306B when the connector is in a first orientation with respect to the cavities 306A, 306B. Once threaded through the connectors can be moved into a second orientation that makes them more difficult to remove. The orientations can include, but are not limited to, vertical, horizontal, a combination thereof, and the like. As mentioned, in some embodiments, the elongate members 304A, 304B can be tightened, shortened, or twisted to reduce the size of the cavities 306A, 306B and to make it more difficult for the cable connectors to be pulled out. In certain embodiments, the elongate members 304A, 304B are stretched to allow the cable connectors to pass through the cavities 306A, 306B. Once the cable connectors have passed through the cavities 306A, 306B, the elongate members 304A, 304B return to their original form, making it less likely that the cable connectors will slip through the cavities 306A, 306B unaided.

Figure 4A:
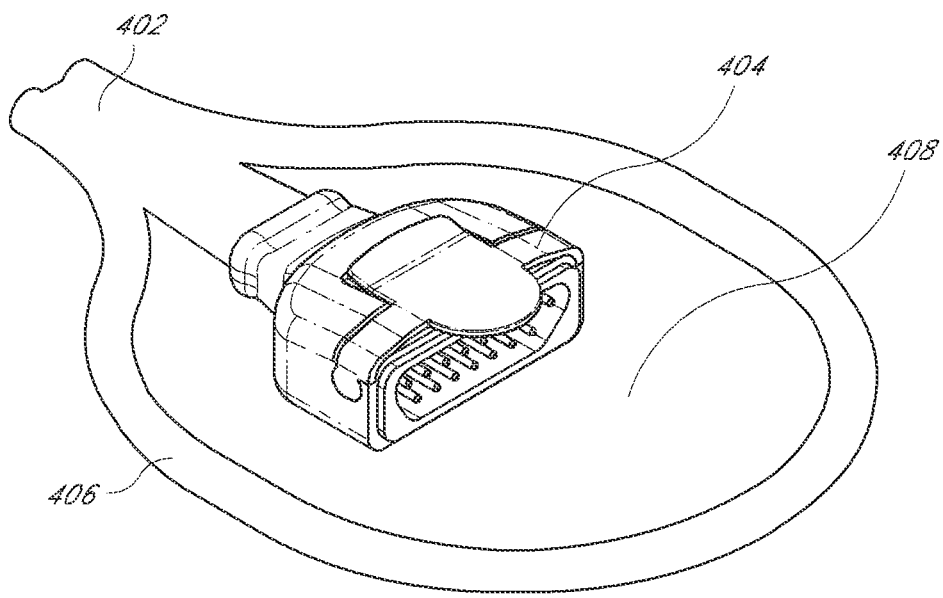

FIG. 4A is a perspective view of a cable tether system 400 that includes a base member 402, a cable connector 404, an elongate member 406, and cavity 408 formed around the cable connector 404. In the illustrated embodiment, the base member 402 is a cable or integrated with a cable. The elongate member 406 and cavity 408 can be in a form similar to that of elongate members 304A, 305B and cavities 306A, 306B, respectively, of FIG. 3.

The cable connector of a second cable can be threaded through the cavity 408 and connected with the cable connector 404. In some embodiments, the second cable connector can be easily threaded through the cavity 408 when in a first orientation and not easily removed when in a second orientation. In certain embodiments, the elongate member 406 is stretched to allow the second cable connector to pass through. In some embodiments, the elongate member 406 can be shortened, tightened, or twisted to reduce the size of the cavity 408 and to make it more difficult for the connector on the second cable to be removed. In certain embodiments, the second cable can include a fastener, such as a clamp, clasp, pin, hook, buckle, etc. to further secure the cables together.

Figure 4B:
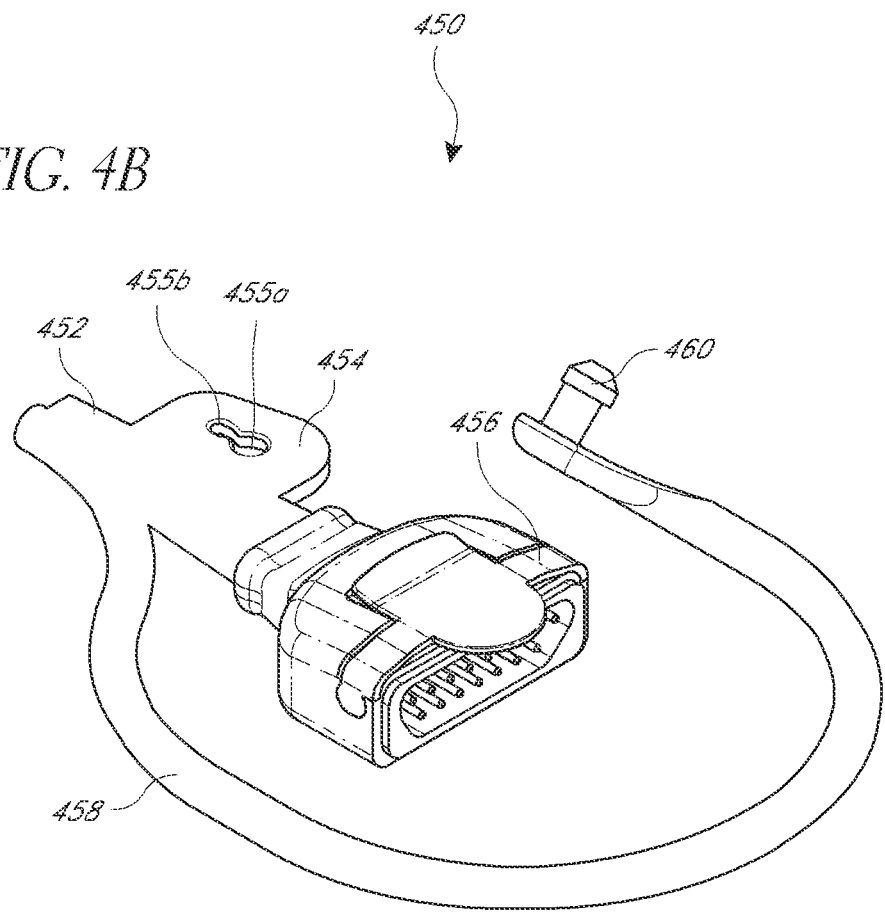

FIG. 4B is a perspective view of another embodiment of a cable tether system 450. In the illustrated embodiment, the cable tether system 450 includes a base member 452, an engagement portion 454 with two cavities 455A, 455B, a cable connector 456, and an elongate member 458 with an engagement portion 460. In the illustrated embodiment, the base member 402 is a cable or integrated with a cable. The engagement portions 454, 460 and elongate member 458 are similar to the engagement portions and elongate members discussed previously with reference to FIGS. 1A and 1B.

During use, the elongate member 458 wraps around a second cable and the engagement portions 454, 460 secure the distal end of the elongate member 458 to the base member 452, thereby securing the base member 452 to the second cable. In the illustrated embodiment, the engagement portion 460 is inserted into the first cavity 455A and moved into a secured position within the second cavity 455B. Many alternatives exist for the engagement portions 454, 460, as described in greater detail above with reference to FIGS. 1A and 1B.

Figure 5:
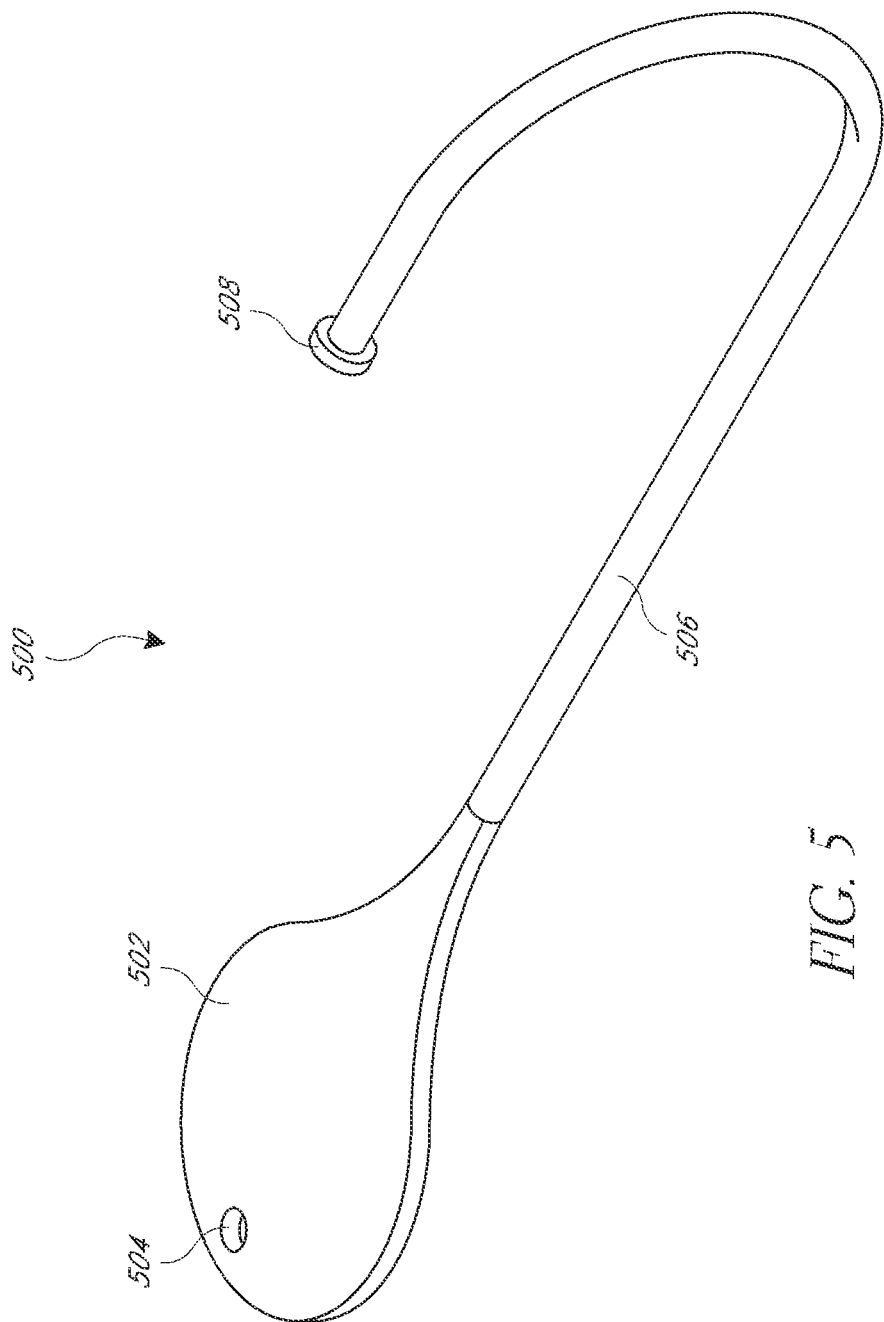

FIG. 5 is a perspective view of a cable tether system 500 that includes a base member 502, elongate member 506 and engagement portions 504, 508. The base member 502 and elongate member 506 can be formed in a manner similar to that described above with reference to FIGS. 1A and 1B. In the illustrated embodiment, the engagement portion 504 includes a cavity and the engagement portion 508 includes a protrusion, however, other configurations can be used as described above with reference to FIGS. 1A and 1B. During use, the elongate member 506 is wrapped around two cables and the engagement portion 508 is secured within the engagement portion 504, thereby securing the two cables to the cable tether system 500.

Figure 6B:
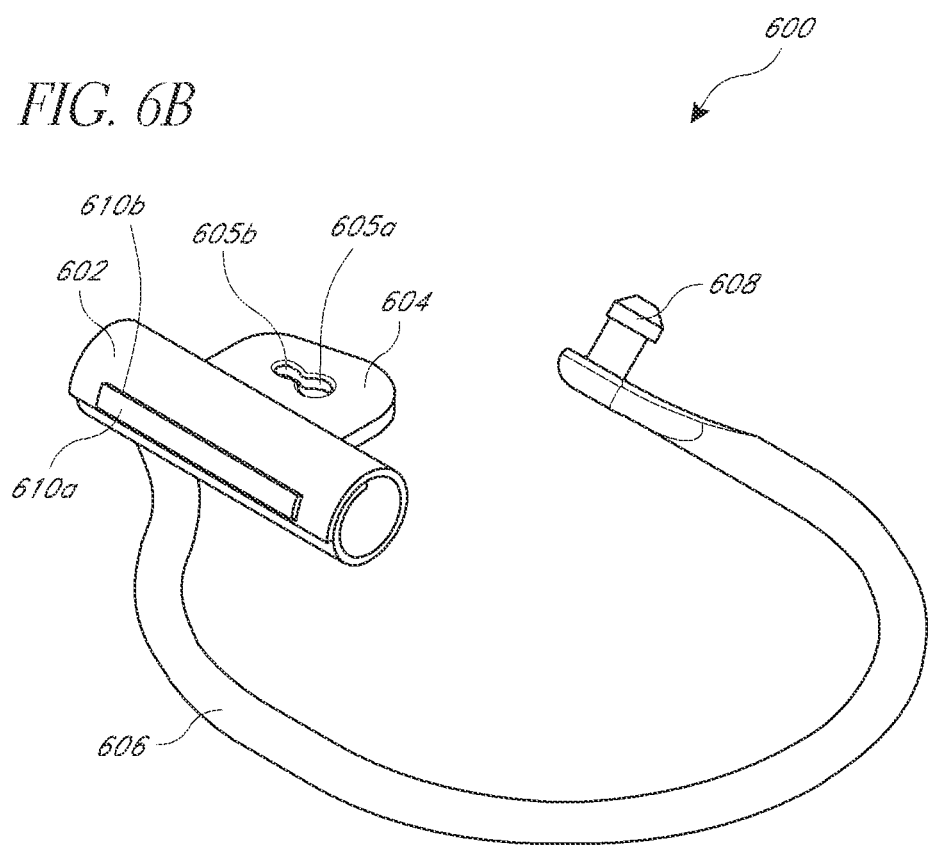

FIGS. 6A and 6B are perspective views of a cable tether system 600 in an open and closed state, respectively. The cable tether system 600 includes a base member 602, a first engagement portion 604 with two cavities 605A, 605B, an elongate member 606, a second engagement portion 608 with a protrusion, and third and fourth engagement portions 610A, 610B.

The base member 602 can be made of a plastic or other flexible material, as discussed previously with reference to FIGS. 1A and 1B. The base member 602 can be wrapped around a portion of a cable (not shown) near the cable connector (not shown). In some embodiments, the base member 602 encircles at least a portion of the cable. When wrapped around the cable, the engagement portions 610A, 610B couple to secure the cable tether system 600 to the cable (not shown), as illustrated in FIG. 6B. The engagement portions 610A, 610B can be formed as a protrusion and cavity, or other configuration as described above with reference to FIGS. 1A and 1B.

Similar to the cable tether systems discussed previously and with reference to FIGS. 1A, 1B, and 8, the elongate member 606 can wrap around a second cable. The protrusion of the engagement portion 608 can be inserted into the cavity 605A of the engagement portion 604 and moved into the cavity 605B to secure the distal end of the engagement portion 608 to the base member 602. In this way, the two cables can be secured to the cable tether system 600. It is to be understood that various configurations can be used to implement the engagement portions 604, 608, as described above with reference to FIGS. 1A and 1B.

Figure 7:
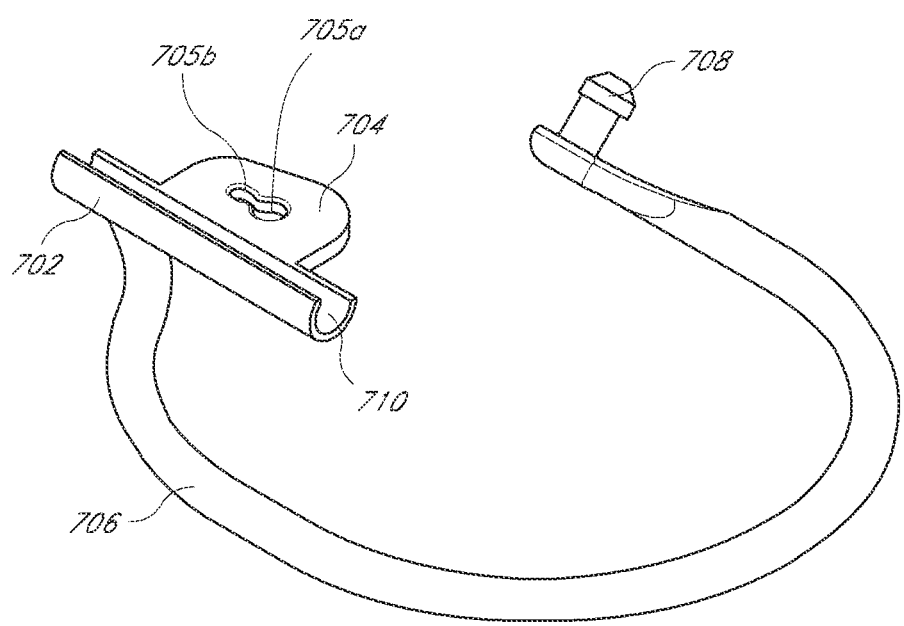

FIG. 7 is a perspective views of a cable tether system 700 that can be fitted to a cable (not shown). The cable tether system 700 includes a base member 702, a first engagement portion 704 with two cavities 705A, 705B, an elongate member 706, and a second engagement portion 708 with a protrusion.

The base member 702 can be made of a plastic or other relatively rigid material that can substantially maintain its shape. The base member 702 is formed to include a hollowed portion 710 and to fit snugly against a cable (not shown). In some embodiments, the base member 702 is snapped onto a cable (not shown) near the cable connector (not shown) and partially encloses a portion of the first cable. In some embodiments, the base member 702 forms a sleeve that encircles at least a portion of the first cable. In certain embodiments, the base member 702 does not encircle a portion of the first cable. Similar to the cable tether systems discussed previously, the elongate member 706 can wrap around a second cable. The protrusion of the engagement portion 708 can be inserted into the cavity 705A of the engagement portion 704 and moved into the cavity 705B to secure the distal end of the engagement portion 708 to the base member 702. In this way, the two cables can be connected to the cable tether system 700. It is to be understood that various configurations can be used to implement the engagement portions 704, 808, as described above with reference to FIGS. 1A and 1B.

Reference throughout this specification to "some embodiments," "certain embodiments," or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the features illustrated may be made without departing from the spirit of the disclosure. As will be recognized, certain embodiments of the inventions described herein may be embodied within a form that does not provide all of the features and benefits set forth herein, as some features may be used or practiced separately from others.

What is claimed is:

1. A cable tether system, comprising:
a base member comprising a cable engagement portion configured to fully encircle a circumference of at least a portion of a first cable, wherein the base member comprises a flap formed from a portion of the cable engagement portion, the flap configured to extend radially from the first cable when encircled by the cable engagement portion, the flap comprising a first engagement portion; and
an elongate member comprising a length extending from a proximal end adjacent to the base member to a distal end extending away from the base member, the length of the elongate member configured to at least partially encircle at least a portion of a second cable by securing a second engagement portion at said distal end of the elongate member to the first engagement portion of the base member,
wherein the second engagement portion comprises a protrusion configured to detachably couple with at least one cavity of the first engagement portion, wherein the protrusion comprises a head portion coupled to a body of the elongate member via a neck portion, wherein the head portion has a larger perimeter than the neck portion.

2. The cable tether system of claim 1, wherein the cable engagement portion comprises a sleeve.

3. The cable tether system of claim 1, wherein the base member is configured to snap onto the first cable.

4. The cable tether system of claim 1, wherein the head portion and the neck portion extend perpendicular to the body of the elongate member.

5. The cable tether system of claim 1, wherein a width of the base member is greater than a width of a connector of the first cable and a connector of the second cable.

6. The cable tether system of claim 1, wherein the base member is configured to secure the first cable to the cable tether system.

7. The cable tether system of claim 1, wherein the base member is configured to secure the first cable to the cable tether system, wherein the elongate member is configured to secure the second cable to the cable tether system.

8. The cable tether system of claim 1, wherein the elongate member extends away from the base member in a longitudinal direction of the base member.

9. A cable tether system, comprising:
a base member comprising a cable engagement portion configured to fully encircle a circumference of at least a portion of a first cable, wherein the base member comprises a flap formed from a portion of the cable engagement portion, the flap configured to extend radially from the first cable when encircled by the cable engagement portion, the flap comprising a first engagement portion; and
an elongate member extending away from the base member and configured to surround at least a portion of a second cable, wherein the elongate member comprises a second engagement portion configured to secure a distal end of the second engagement portion to the first engagement portion of the base member,
wherein the first engagement portion comprises a first cavity and a second cavity, wherein the first cavity is larger than the second cavity.

10. A cable tether system, comprising:
a base member comprising a cable engagement portion configured to fully encircle a circumference of at least a portion of a first cable, wherein the base member comprises a flap formed from a portion of the cable engagement portion, the flap configured to extend radially from the first cable when encircled by the cable engagement portion, the flap comprising a first engagement portion; and
an elongate member comprising a length extending from a proximal end adjacent to the base member to a distal end extending away from the base member, the length of the elongate member configured to at least partially encircle at least a portion of a second cable by securing a second engagement portion at said distal end of the elongate member to the first engagement portion of the base member,
wherein the base member is composed of a first material, wherein the elongate member of a second material that is different from and more flexible than the first material.

11. A cable tether system, comprising:
a base member formed of a flexible material, the base member comprising:
a cable engagement portion configured to fully encircle a circumference of at least a portion of a first cable,
a tab formed from a portion of the base member, the tab configured to extend radially from the first cable when encircled by the cable engagement portion, the tab comprising a first engagement portion configured to couple with a second engagement portion,
a third engagement portion, and
a fourth engagement portion configured to at least partially encircle at least a portion of a first cable when engaged with the third engagement portion; and
an elongate member comprising a length extending from a proximal end adjacent to the base member to a distal end extending away from the base member, the length of the elongate member configured to at least partially encircle at least a portion of a second cable by securing a second engagement portion at said distal end of the elongate member to the first engagement portion of the base member,
wherein the second engagement portion comprises a protrusion configured to detachably couple with the first engagement portion, wherein the protrusion comprises a head portion coupled to a body of the elongate member via a neck portion, wherein the head portion has a larger perimeter than the neck portion.

12. The cable tether system of claim 11, wherein the third engagement portion forms a hollow portion that is configured to at least partially enclose the at least a portion of the first cable.

13. A cable tether system, comprising:
a flexible base member, wherein the base member comprises a first engagement portion, a second engagement portion on a first end of the base member, and a third engagement portion on a second end of the base member different from the first end, wherein the base member comprises a cable engagement portion configured to fully encircle a circumference of at least a portion of a first cable when the second engagement portion is coupled to the third engagement portion and wherein the base member further comprises a flap formed from a portion of the cable engagement portion, the flap configured to extend radially from the first cable when encircled by the cable engagement portion, the flap comprising at least the first engagement portion; and
an elongate member comprising a length extending from a proximal end adjacent to the base member to a distal end extending away from the base member, the length of the elongate member configured to at least partially encircle at least a portion of a second cable, wherein the elongate member comprises a fourth engagement portion that couples with at least one cavity of the first engagement portion, wherein the second engagement portion comprises a protrusion configured to detachably couple with the first engagement portion, wherein the protrusion comprises a head portion coupled to a body of the elongate member via a neck portion, wherein the head portion has a larger perimeter than the neck portion.

14. The cable tether system of claim 13, wherein the second engagement portion is configured to couple to the third engagement portion to form a hollow portion that is configured to at least partially enclose the at least a portion of the first cable.

* * * * *